United States Patent
Svensson

(10) Patent No.: US 9,085,288 B2
(45) Date of Patent: Jul. 21, 2015

(54) METHOD FOR OPERATING A BRAKE ASSISTANCE SYSTEM IN A VEHICLE

(71) Applicant: FORD GLOBAL TECHNOLOGIES, LLC, Dearborn, MI (US)

(72) Inventor: Thomas Svensson, Leichlingen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 258 days.

(21) Appl. No.: 13/875,182

(22) Filed: May 1, 2013

(65) Prior Publication Data

US 2013/0297168 A1 Nov. 7, 2013

(30) Foreign Application Priority Data

May 2, 2012 (DE) .......................... 10 2012 207 264

(51) Int. Cl.
*B60T 7/22* (2006.01)
*B60T 8/1755* (2006.01)
*B60T 8/32* (2006.01)

(52) U.S. Cl.
CPC ................. *B60T 7/22* (2013.01); *B60T 8/1755* (2013.01); *B60T 8/3275* (2013.01); *B60T 2201/022* (2013.01); *B60T 2201/03* (2013.01)

(58) Field of Classification Search
CPC ....... B60T 11/16; B60T 11/28; B60T 11/101; B60T 11/103; B60T 11/224; B60T 8/17; B60T 8/26; B60T 8/36; B60T 8/58; B60T 8/94; B60T 8/246; B60T 8/344; B60T 8/885; B60T 8/1706; B60T 8/1708; B60T 8/1755; B60T 8/1764; B60T 8/1766; B60T 8/3275; B60T 8/3655; B60T 8/4059; B60T 8/4081; B60T 8/4872; B60T 8/5006; B60T 8/17551; B60T 13/56; B60T 13/66; B60T 13/142; B60T 13/145; B60T 13/241; B60T 13/585; B60T 13/662; B60T 13/686; B60T 13/745; B60T 15/028; B60T 7/12; B60T 7/20; B60T 7/042; B60T 17/04; B60T 17/06; B60T 17/22; B60T 1/10; B60T 2270/14; B60T 2270/204; B60T 2270/308; B60T 2270/406; B60T 2270/604; B60T 2210/24; B60T 2201/02; G01L 5/28; B60K 6/445; F15B 3/00; F15B 7/08
USPC ....................... 701/42, 70; 303/113.4; 60/563
See application file for complete search history.

(56) References Cited

U.S. PATENT DOCUMENTS

| 5,727,852 | A * | 3/1998 | Pueschel et al. ............ 303/113.4 |
| 6,226,586 | B1 * | 5/2001 | Luckevich et al. .............. 701/70 |
| 6,993,907 | B2 * | 2/2006 | Cooney .......................... 60/563 |
| 8,762,020 | B2 * | 6/2014 | Ummer et al. .................. 701/70 |
| 2011/0029211 | A1 * | 2/2011 | Stephenson et al. ............ 701/70 |
| 2012/0109465 | A1 * | 5/2012 | Svensson et al. ............... 701/42 |

FOREIGN PATENT DOCUMENTS

EP     1886888 A2 *  2/2008

OTHER PUBLICATIONS

"Applicants proposed amendments to the claims Mar. 6, 2015"; Applicants proposed amendments to the claims Mar. 6, 2015.pdf; author: Joesph Root; Mar. 5, 2015.*

* cited by examiner

*Primary Examiner* — Mussa A Shaawat
*Assistant Examiner* — James E Stroud
(74) *Attorney, Agent, or Firm* — Joseph E. Root

(57) ABSTRACT

A method of operating a brake assistance system in a vehicle is disclosed. The method includes determining a braking operation as an emergency braking situation, which in turn includes sensing a braking pressure applied to a brake pedal, determining a braking pressure gradient of the braking pressure, and evaluating at least one factor of the driving situation, checking whether that factor indicates an emergency braking situation. If that factor indicates an emergency braking situation, adjustments to a braking pressure threshold value and a braking pressure gradient threshold value are carried out, reducing those threshold values by a predetermined amount. Thereafter, if both the braking pressure and the braking pressure gradient exceed the adjusted braking pressure threshold value and the adjusted braking pressure gradient threshold value, respectively, the braking operation is identified to be an emergency braking situation, accompanying activation of an emergency braking cycle.

6 Claims, No Drawings

METHOD FOR OPERATING A BRAKE ASSISTANCE SYSTEM IN A VEHICLE

BACKGROUND

The present disclosure generally relates to brake systems for vehicles, and, more specifically, to brake assistance systems.

In general, an inability to appropriately decelerate and stop a vehicle results in overshooting a minimum stopping distance, which can lead to an accident. During braking emergencies, panic generally causes a driver to apply the brakes inappropriately, more often than not by pressing the brake pedal as hard as possible, without stopping. Rather than effectively braking, this conduct often results in simply locking the wheels, and ineffective braking method at best. This behavior affects the vehicle's stopping distance, which is undesirable, dangerous, and, more notably, one of the leading causes of accidents worldwide.

Brake assistance systems are widely available to assist drivers during such braking emergencies. Generally, brake assistance systems work to reduce or minimize the vehicle's stopping distance from an oncoming obstruction, aiming to prevent an accident or at least reduce the ensuing damages. More specifically, brake assistance systems automatically apply a predefined amount of braking force upon identifying the driver's intent. Such systems generally operate after a defined delay. A controller, typically belonging to the Electronic Stability Control (ESC) system is responsible for identifying an emergency braking situation. To achieve a shorter braking distance in such situations, the brake assist system increases the braking force, typically up to the maximum amount, until the vehicle's ABS (Anti-lock Braking System) takes control of the wheels. The braking controller and the ABS then cooperate to maintain braking pressure just below a level that causes the wheels to lock. The resulting emergency braking cycle is a rapid series pumps, providing the maximum braking force under the prevailing road conditions.

From the description above, one can see the importance of rapidly identifying an emergency braking situation, as opposed to normal braking An emergency braking situation can be characterized by two factors, braking pressure, and braking pressure gradient. In such situations, the driver often reacts by pressing the brake pedal as hard as possible, much harder than in normal driving. Moreover, the driver is seeking to stop as quickly as possible, so she steps on the brake as quickly as possible, producing a very high pressure gradient. In many situations, however, emergency braking situations can emerge without the driver becoming aware of them. A drowsy driver, for example, may be approaching an obstacle without leaving sufficient stopping distance.

Thus, there remains a need for improved brake assistance systems both to react more effectively in identified emergency braking situations and to assist the driver in recognizing when those situations occur.

SUMMARY

One embodiment of the present disclosure describes a method of operating a brake assistance system in a vehicle. The method includes determining whether a braking operation is an emergency braking situation, which is identified by sensing a braking pressure applied to a brake pedal, determining a pressure gradient of the braking pressure, and evaluating at least one factor related to the driving situation to determine if that factor indicates an emergency braking situation. Upon an evaluation of the driving situation factor, if an emergency braking situation is indicated, a braking pressure threshold value and a braking pressure gradient threshold value are adjusted. More particularly, the adjustment accounts for a reduction in those threshold values by a predetermined amount. Thereafter, if both the braking pressure and the braking pressure gradient exceed the adjusted braking pressure threshold value and the adjusted braking pressure gradient threshold value, respectively, the brake assistance system identifies the braking operation as an emergency braking situation. Once such a situation is identified, an emergency braking cycle is activated.

DETAILED DESCRIPTION

The following detailed description is made with references to its exemplary embodiments, which are included to describe the subject matter of the present disclosure, not to limit its scope, which is defined by the appended claims.

Overview

In general, the present disclosure relates to systems and methods to improve brake assist systems in motor vehicles. Conventionally, such systems activate based upon threshold values of the braking pressure in the braking pressure gradient. In the method of the present disclosure, a number of other factors may contribute to identifying and reacting to an emergency braking situation. Equipment may be employed to identify environmental hazards, deploying devices such as a camera-, infrared-, or a radar-based system, to detect an impending hazard, for example. Based on those hazards, the system may adjust the braking pressure in braking pressure gradient threshold values, reducing them from their original values. Additionally, to improve stopping ability on ice or snow, external temperature sensing may prompt a similar reduction of the two threshold values. Roll stability control systems may detect a critical roll rate of the vehicle according to which the two threshold values may be reduced as well. In these and similar situations, the brake assist system does not recognize an emergency braking situation when in fact such a situation does exist. The present disclosure seeks to identify such situations more fully and to trigger appropriate action by the brake assist system.

Exemplary Embodiments

Finding conventional application in motor vehicles, brake assist systems aim to assist drivers in stopping or decelerating vehicles in situations where normal driver reactions would not succeed in avoiding a collision. Conventional brake assist systems operate in specifically defined situations—when braking pressure or braking pressure gradient exceed a threshold value. Real life driving, however, present situations in which emergency braking action is urgently needed to avoid a collision, yet the two critical factors are not exceeded, and thus the braking system simply does not recognize a dangerous situation or an emergency braking situation. In general, an intervention of the brake assist system is initiated when both the braking pressure and the braking pressure gradient exceed a threshold value. Those events, occurring together, signal a sharp increase in the in the driver's braking effort. The pressure value can be detected by sensing the pressure in the brake master cylinder. The pressure gradient may be determined through well-known means. Once a breach of the two predetermined threshold values is determined, the system initiates emergency braking, cooperating with the ABS to repeatedly increase braking pressure up to the point of wheel lock in a series of rapid pumping actions.

Some factors or conditions that can indicate an emergency driving situation or an emergency braking situation, apart from what has been discussed above, may include the vehicle's yaw, roll, or pitch rate. Other conditions may include the vehicle's speed, the ambient temperature, or surrounding objects, such as a stationary obstacle. These and other external conditions may be detected and evaluated through instruments such as a camera-, infrared-, or radar-based system.

Broadly stated, the present disclosure expands the system's ability to detect emergency braking situations. When such situations are detected, the system adjusts and reduces the threshold values of braking pressure and gradient by a predetermined amount, triggering initiation of the emergency braking cycle described above. More particularly, if both the braking pressure and the braking pressure gradient exceed the adjusted braking pressure threshold value and the adjusted braking pressure gradient threshold value, respectively, an emergency braking situation is identified, and thus, an emergency braking cycle is activated.

Accordingly, some embodiments of the present disclosure include a sensor system for detecting surrounding objects. Such a system may be based on visual instruments, such as cameras, or instruments based on ultrasound, infrared, or radar technology. Such a system may be deployed to detect surrounding objects in a desired direction, such as in front of the vehicle. As is known in and available to the art, systems may further be provided to receive input from such sensors and to identify objects that may pose a threat. For example, a stationary object may be detected in the projected vehicle path, and the system may thus conclude that the vehicle is likely to collide with that object. Further, moving objects may be detected and their present trajectory computed to determine whether these objects present a threat. A threat presented by any such object can result in the system recognizing an emergency braking situation. The system can respond by reducing the threshold braking pressure and braking pressure gradient values to the existing level, which in turn could initiate the braking assist cycle.

In one example, the reduction in braking pressure threshold value may range between about 10-30 bar, while the braking pressure gradient threshold value may be reduced by about one-third to half of its original value. Other numerical ranges according to which a reduction in the threshold values is obtained may be contemplated as well, as will be understood by those skilled in the art. Such reductions may be carried out, for example, through a controller that may belong to the vehicle ESC, or that controller may form a standalone unit. Adding a determination of exterior enables a more timely activation of the brake assistance system, reduces the braking distance, and thus safeguards the vehicle and its occupants in the event of an impending collision.

Some embodiments add a further factor to be monitored, the ambient temperature. A temperature sensor on most contemporary vehicles is already monitoring this factor. Low ambient temperature can cause a number of problems. For example, below 0° C., the coefficient of friction between the brake pads and the rotor may considerably reduce, impairing braking performance. At the same time, low temperatures may also produce an increase in the viscosity of the brake fluid, further hampering braking. And of course, low temperatures bring the possibility of ice and snow, which reduce or eliminate friction between a tire and the road surface.

When low ambient temperature is detected by the temperature sensor, the method according to the present disclosure reduces the braking pressure and the braking pressure gradient threshold values. That reduction allows the brake assistance system to initiate emergency braking at lower pressure and pressure gradient levels, which can compensate for lower braking effectiveness. The method of the present disclosure calculates the amount by which the pressure and pressure gradient threshold values should be reduced. Those amounts are calculated by multiplying the threshold values by a suitably derived reduction factor. More particularly, the braking pressure threshold value is multiplied by a first factor, which is derived through the ratio of a brake lining coefficient of friction at the determined external temperature to a brake lining coefficient of friction at a specifiable first reference temperature, for example about 100° C. Correspondingly, the braking pressure gradient threshold value is multiplied by a second factor, derived from the ratio of a brake fluid viscosity value at the determined external temperature to a brake fluid viscosity value at a specifiable second reference temperature, for example about 20° C.

In an alternative implementation of the temperature compensation routine set out above, both the braking pressure threshold value and the braking pressure gradient threshold value are multiplied by the first or the second factor only if the external temperature falls below a specific level, for example about −20° C. Or, a progressive reduction of the threshold values may be contemplated as well, which may result from varying external temperature conditions. For example, when the vehicle travels from a higher temperature region to a lower temperature region, every unit drop in an ambient temperature may cause the threshold values to be proportionally reduced. Those in the art may conceive a combination of such variations or reduction methodologies, and thus, none of the embodiments disclosed here should be viewed as limiting in any way. Therefore, the brake assistance system may always achieve a higher or a suitable braking effect, even when external temperatures vary or remain low.

Yet another embodiment takes into account the vehicle's roll rate. That information by a roll rate sensor system, which is already available in the art, through a system known as roll rate stability controller (RSC). A determination that the vehicle stands in danger of rolling should trigger an emergency response, and here the braking pressure and braking pressure gradient threshold values are each reduced to a value close to zero. That is, the system is not simply placed in a warning state, but rather, the emergency braking is initiated immediately.

The critical roll rate may be a predetermined or pre-specified data point that facilitates activation of the vehicle's roll stability control. For example, when a vehicle's roll rate exceeds a pre-specified or a preset value, a critical roll rate may be established and identified. When a higher roll rate is identified, a reduction of the braking pressure threshold value and the braking pressure gradient threshold value, to a value of about zero, may assist the RSC to control the vehicle in an optimal fashion. More descriptively, during a breach of the critical roll rate information, a resulting slippage of tires may affect the working of the vehicle's RSC, but through the identification of the critical roll rate, the tires' slippage may be adequately controlled or reduced through the (Anti-lock Braking System) ABS. Moreover, in such situations, the wheels or tires that respond appropriately to the RSC are brought to their locking limit as soon as possible. Therefore, apart from improving the braking effect provided by the brake assistance system, such functionality may also enable the RSC to respond faster for stabilizing the vehicle in a desired manner.

Another embodiment of the present disclosure monitors the yaw rate to identify potential emergency situations. Here, the yaw rate factor is defined as the quotient of an actual vehicle direction deviation and the vehicle direction deviation through which the electronic stability controller is activated. The actual vehicle direction deviation is determined through the difference between the actual driving direction of the vehicle and the desired driving direction specified by the vehicle's driver. In particular, the vehicle direction deviation, through which the electronic stability controller is activated, is a fixed set value predetermined for the electronic stability controller (ESC). Moreover, the directions are each measured about the vertical or yaw axis of the vehicle. The yaw rate factor thus determines the ratio of the actual vehicle direction deviation to the vehicle direction deviation through which the electronic stability controller (ESC) is activated.

More particularly, when an overly high yaw rate is found, the braking pressure threshold value may be reduced to a value between 10 bar and 30 bar and the braking pressure gradient threshold value may be reduced between one-third and half of its original threshold value. It should be noted that an excessive yaw rate could also trigger activation of the vehicle ESC as well as modifying the braking system values. Further, a critical yaw rate is achieved on exceeding a specific yaw rate of the vehicle, for example, on exceeding a yaw rate factor of about 0.8, the ESC of the vehicle may be activated.

Effectively, the direction of the actual vehicle direction deviation (the distinction between a vehicular under steer and over steer), is used to form the specifiable or critical yaw rate information. This helps achieve the desired reduction in the threshold values of the braking pressure and the braking pressure gradient.

An alternative implementation may employ time derivative of the yaw rate factor. Here, the braking pressure threshold value may be reduced to a value between 10 bar and 30 bar and the braking pressure gradient threshold value may be reduced to a value between one-third and half of its original threshold value, whenever the time derivative of the yaw rate factor exceeds a specific, specifiable threshold value. In relation to such reductions in the threshold values of the braking pressure and braking pressure gradient, those in the art may contemplate other variations and alternatives based on the vehicle's yaw factor.

Further, a combination of the actual value of the yaw rate factor and the time derivative of the yaw rate factor can be employed for forming the specifiable or critical yaw rate information. For example, the threshold value when observed to exceed a specified yaw rate factor can be reduced as soon as the time derivative of the yaw rate factor assumes a high value.

Information indicating that existing driving conditions include ice and snow can also be employed. Such knowledge could be obtained from weather service bulletins, for example, or icy conditions could be observed directly by monitoring tire slippage. Accordingly, when a relatively low coefficient of friction (g) between tires and the road surface is determined, then the threshold values of the braking pressure and the braking pressure gradient may be omitted. Such a provision may ensure that a vehicle's understeer characteristics are not triggered by braking In the embodiments described above, both the braking pressure build-up for the electronic stability controller (ESC) of the vehicle in particular and the brake assistance system in general are assisted by reducing the braking pressure threshold value and the braking pressure gradient threshold value.

The method described above is not restricted to the circumstances set out there, but it may also be applicable to similar environments. Further, the addition and removal of components from what has been disclosed may be contemplated as well. The disclosed method either may work in combination or in tandem with other known systems or components, or it may optionally run as a standalone entity. Moreover, a person skilled in the art may ascertain multiple modifications or enhancements to the brake assist system described here, and thus, all such ways may fall within the scope of the present disclosure.

The specification has set out a number of specific exemplary embodiments, but those skilled in the art will understand that variations in these embodiments will naturally occur in the course of embodying the subject matter of the disclosure in specific implementations and environments. Thus, the features and embodiments listed individually in the above description can be combined with each other in any technically purposeful manner and represent further embodiments of the disclosed subject matter. It will further be understood that such variation and others as well, fall within the scope of the disclosure. Neither those possible variations nor the specific examples set above are set out to limit the scope of the disclosure. Rather, the scope of claimed invention is defined solely by the claims set out below.

I claim:

1. A method of operating a brake assistance system in a vehicle, the method comprising: determining whether a braking operation is an emergency braking situation, including sensing a braking pressure being applied to a brake pedal: determining a braking pressure gradient of the braking pressure; evaluating at least one factor relating to a driving situation, the one factor being the likelihood of a collision, based on information obtained from at least one of a camera-, infrared-, or a radar-based sensor system, or the ambient temperature, employing a temperature sensor system, to determine whether that factor indicates an emergency braking situation; upon evaluating the driving situation factor as indicating an emergency braking situation, adjusting a braking pressure threshold value, including multiplying the braking pressure threshold value by a first factor derived from a ratio of a brake lining coefficient of friction at a determined external temperature to a brake lining coefficient of friction at a specifiable first reference temperature, the resulting braking pressure threshold value being a value between 10 bar and 30 bar; and reducing a braking pressure gradient threshold value, including multiplying the braking pressure gradient threshold value by a second factor derived from a ratio of a brake fluid viscosity value at the determined external temperature to brake fluid viscosity value at a specifiable second reference temperature, the resulting braking pressure gradient threshold value being a value between one third and half of the braking pressure gradient threshold value identifying the braking operation as an emergency braking situation if both the braking pressure and the braking pressure gradient exceed the adjusted braking pressure threshold value and the adjusted braking pressure gradient threshold value; and upon an identification of the braking operation as an emergency braking situation, activating an emergency braking cycle.

2. The method of claim 1, further comprising evaluating an additional factor related to the driving situation wherein the additional factor is a determination of a roll rate information of the vehicle, employing a roll state sensor system.

3. The method of claim 2, wherein following a determination of a specifiable roll rate information, adjusting the values includes reducing the braking pressure threshold value and the braking pressure gradient threshold value to a value of about zero.

4. The method of claim 1, further comprising evaluating an additional factor related to the driving situation, wherein the additional factor driving situation is a determination of the yaw rate information of the vehicle, which is determined through a yaw rate sensor.

5. The method of claim 4, wherein following a determination of a specifiable yaw rate information, adjusting the values includes reducing the braking pressure threshold to a value between 10 bar and 30 bar and reducing the braking pressure gradient threshold value to a value between one third and half of the braking pressure gradient threshold value.

6. The method of claim 4, wherein the yaw rate information is derived from at least one of a yaw rate factor or a derivative of the yaw rate factor.

* * * * *